Patented Apr. 30, 1935

1,999,973

UNITED STATES PATENT OFFICE 1,999,973

SEWAGE PURIFICATION

Albert L. Genter, Baltimore, Md.

Application August 21, 1933, Serial No. 686,146

29 Claims. (Cl. 210—2)

My invention relates to the treatment of sludges and particularly those obtained from industrial waste, domestic and other sewages and sludges containing putrescible matter and their consequent biochemical decomposition products resulting during the accumulation and detention of sludge, e. g., ammoniacal compounds and which chemically transform and thereby lessen the efficiency of flocculating agents added to coagulate sludge. This treatment involves the use of an agent, such as elutriation, chemical treatment, or both, and which appreciably lessens the heretofore wasteful chemical activity of the decomposition products upon coagulants or flocculants. At the same time the agent does not in relation to its lessening effect on the activity of the decomposition products substantially impair the useful activity of the flocculating or coagulating means. Hence, a substantial decrease in amount of flocculant or coagulant required, with consequent saving in operating costs, is made possible. I have particularly in mind the treatment of the final sludges themselves, i. e. (1) raw sewage sludge, (2) activated sewage sludge, (3) digested sewage sludge, (4) mixtures of these, and (5) sludges from all industrial wastes containing putrescible matter of any kind.

By sludge, I mean the sediment or deposit, composed mostly of liquid and organic solids, obtained from any sewage stream by decanting off or otherwise removing the main bulk of clear liquid.

Thus such sludge may contain practically all of the "raw" or "crude" orangic waste solids entering a sewage disposal plant and be therefore termed "raw" or "crude" sludge; or it may be a mixture of such crude sludge and returned or wasted excess biologically active floc obtained by the final sedimentation of this floc in the activation treatment of sewage and be termed "primary sludge"; or it may be the "waste sludge" obtained by final sedimentation of the biologically active floc in sewage activation; or, again, it may be the final sludge obtained by the anaerobic digestion or decomposition of any of the foregoing sludges or mixtures of same and be therefore called "digested sludge" or "ripe sludge".

I have discovered that the presence of ammoniacal compounds in these sediments, known as sewage sludges, is detrimental to economic flocculation of the colloids and coarse colloidal suspensions in such sludges. Briefly stated, the present invention aims to render such sediments or sludges readily dewaterable by accomplishing deammonification of the sludges or sediments before their dewatering or before their treatment with coagulants and dewatering.

I use the term "deammonification" in a literal sense and to include a substantially complete removal or any diminishing of the concentration of soluble ammoniacal compounds in any of such sludges. That is, by diminishing the concentration of soluble ammoniacal compounds in the sediments, I am able to overcome and lessen the influences which heretofore have retarded efficient flocculation and dewatering of such sludges.

By "ammoniacal compounds" I mean those compounds that pertain to ammonia itself or which contain nitrogen and are structurally related to ammonia, i. e. the compounds of ammonia and its derivatives which are herein understood to be organic compounds derived from $NH_3$ by the substitution of radicals for H, such as (1) amines or ammonia and ammonium bases, (2) amides, imides and nitriles and (3) amino acids. And I more explicitly mean all of these products and their combinations that result from the decay, organic degradation and putrefaction of all proteins and the consequent hydrolysis oxidation or reduction of the amino acids themselves. Stated another way, I diminish the concentration of biochemical decomposition products resulting during the accumulation and detention of sludge and which chemically transform and thereby lessen the efficiency of flocculating agents added to coagulate the sludge.

In accordance with the present invention, the amount of coagulants used is materially lessened over present practice and, in fact, in some cases may be entirely eliminated. Hence, the excessive cost of coagulants is minimized and the filtration capacity of any given filter area is economically enhanced.

Such diminishing of the ammoniacal compounds is accomplished by chemical treatment, by elutriation, or by any combination of these two and the resultant sludge is rendered easily dewaterable. In the case where the sludge is chemically treated or elutriated, optimal flocculation is obtained with a minimum of coagulant and where elutriation and chemical treatment or chemical treatment and elutriation are resorted to, in some cases flocculation takes place without the addition of a coagulant or with the use of a comparatively negligible percentage of coagulant. The savings in the cost of coagulant, in equipment, and the time required to dewater the final sludge, makes the present invention not only applicable for use in large cities, but also renders it economically feasible for relatively small towns and municipalities.

By elutriation of sewage sludge I mean the operation of any final sewage sediment or sludge called "raw sludge", "crude sludge", "waste activated sludge", "primary sludge", "digested sludge" "ripe sludge", or mixtures of any and/or all of such sludges as now produced according to any accepted sewage disposal practice and ready for final dewatering, or coagulation and dewatering, whereby (1) in this operation this final sludge is rediluted and the concentration of soluble ammoniacal compounds therein is diminished by a diffusion of such soluble compounds into the elutriating water or solution and (2) a reconcentration of a final sludge from this diluted mixture by sedimentation and decantation or other means, which new final sludge contains an appreciably lower concentration of ammoniacal compounds than the inital sludge so treated.

I am aware of the fact that there exist in some cities, disposal plants which produce sludges by subsidence at two or more different plants, or widely separated points within the same plant, and, in order to handle all sludge at one central point, the sludge produced at a relatively distant point is diluted, in order to reduce its viscous consistency and thereby render it more readily transportable through pumps or pipe lines to a central sewage treatment and sludge handling station. At this central station it may be mixed with fresher sewage entering this plant, and all of the organic solids in the mixture may then be subsided and concentrated into one final sludge ready for dewatering. My process is intended to be applied to this final sludge, as such final sudge is relatively rich in putrescible matter and consequently in soluble ammoniacal compounds, in spite of the redilution, transportation, reconcentration and consequent detention of the so diluted fraction.

I am likewise cognizant of the fact that in an activation plant, using coagulants and mechanical dewatering devices for dewatering the final waste sludge, the effluent from such devices, employed for dewatering the waste sludge, containing the excess coagulant demanded by such sludge that has not been deammonified by my process, may be returned to the so-called "mixed liquor" or activated sewage stream containing the biologically active floc, thus merely diluting such "mixed liquor" before subsidence of the biologically active floc, contained therein, into a final sludge. Although this may be done to aid in final sedimentation of the floc and with the intention of changing the hydrogen ion concentration of the final sludge and thereby save coagulant, it does not constitute the redilution and elutriation of the final waste sludge itself.

By chemical treatment I mean the operation on any final sewage sediment or sludge as now produced according to any accepted sewage disposal practice and ready for final dewatering, whereby the concentration of soluble ammoniacal compounds in this sludge is diminished by chemical means.

The present invention, therefore, is to be distinguished from those processes wherein, after sedimentation of the sludge and decantation of the clarified sewage effluent, this clarified effluent is treated to render innocuous the dissolved bacterial food, such as ammonia. As an example of such numerous processes, I refer to that set forth in the patent to Gleason and Loonam 1,886,267, November 1, 1932, wherein the thoroughly clarified sewage water is filtered through base exchange materials such as zeolites, to replace the putrescible base. With such processes, the problem of treating the sludge or sediment and the use of an excessive amount of coagulant still remain, for example the process described in the patent to Gleason and Loonam requires for the flocculation of the sludge sediment up to three hundred (300) times as much coagulant as does the present invention.

The present invention is likewise to be distinguished from all so-called "activated-sludge" processes which consist essentially in the agitation of a mixture of sewage, preferably after the subsidence and withdrawal of the crude organic solids, with about fifteen per cent or more of its volume of returned bacterially active liquid sludge flocculi, in the presence of ample atmospheric oxygen, followed by sedimentation adequate for the subsidence of the biologically active sludge flocculi, thus producing a relatively pure liquid effluent. This process of biologically oxidizing the dissolved nitrogenous products in the liquid stream bears no relation to removing ammoniacal compounds from the crude solids removed as a sludge from such a stream. Such sludges that are separated from the liquid portion of such streams by subsidence in order to dewater and dispose of the solids in same, are particularly rich in putrescible matter and my process is particularly adapted to render them more readily dewaterable.

All of the sludges now accumulated and produced in a domestic sewage disposal plant are difficult to dewater by filtration and a great amount of engineering and scientific attention has been devoted to the problem. In spite of all the modern advances in the purification of the relatively immense liquid fraction of domestic sewage, the final dewatering of the relatively smaller sludge fraction still involves the expenditure of large sums of money for various chemical coagulants which are used in unduly large amounts for rendering these sludges readily dewaterable.

I have discovered that the necessity of using such large amounts of various coagulants is not so much due to the colloidal nature of the suspended sewage solids themselves, but to the presence of dissolved, as well as insoluble, putrefactive products which consume the greater portion of coagulants added and form chemical compounds which are mostly detrimental to rapid filtration.

I have, moreover, discovered that the consumption of coagulating ions, e. g. ferric, ferrous, aluminum, calcium and similar well known and conventional coagulants used in coagulating sewage solids to render them easily and economically filterable, is in direct proportion to the soluble ammoniacal compounds present as final putrefactive products in various sewage sludges.

My invention, therefore relates to conditioning of various types of sewage sludges, resulting from the various methods of concentrating these sludges in domestic sewage treatment plants, for final dewatering and disposal, either as dried fertilizer or incinerated ash. My invention is a direct result of the discovery of the detrimental influence of ammonia, its derivatives and compounds, produced during putrefaction, and involves the partial or complete removal of the ammonia, ammonia derivatives and ammoniacal compounds from the liquid surrounding the sludge particles, previous to dewatering, or coagulation of the negatively charged colloidal suspensions and coarser sediment particles with any desired coagulant and dewatering.

My process and its various means of bringing about the desired removal or diminishing of the ammonia, ammonia derivatives and ammonia compounds from the liquid surrounding the sludge particles, after the raw sludge and mixtures of raw and activated sludge flocculi have been separated from the main bulk of liquid in the sewage flow, and even after the digestion of this sludge, or of mixtures of raw and activated sludges, results in very remarkable reductions of the amounts of coagulants necessary for rendering the final sludge readily dewaterable, i. e. economically filterable in continuous filters, centrifuges and the like.

This removal of such ammoniacal compounds from all customary final sewage sludges whether raw, activated or digested, or combinations of any and all of such sludges, as stated, results in enhanced flocculation and economic use of coagulants, and moreover, further reduces the amount of reagents necessary to the process described in my copending application Serial No. 645,485.

With respect to the detrimental action of the ammoniacal compounds, I have discovered that the solubility of the hydroxides and carbonates of lime, iron, aluminum etc. resulting from adding well known coagulants to sewage sludges is greatly increased by the presence of ammonium ions and carbamino compounds produced during the putrefaction of sewage. The well known ferric hydroxide and succinate precipitates formed when ferric chloride is added to sewage sludges, are rendered gelatinous, viscous, difficult to filter and even soluble in the presence of ammoniacal and carbamino compounds. The same is true in the cases of ferrous hydroxide, alumina hydroxide, calcium hydroxide and carbonate, when any such coagulants or other metallic coagulants are added alone or in combinations to sewage sludges.

All of these coagulants form with ammonia and its salts a group of complex metal-ammonia or "coordination" compounds which may be regarded as the metal salts with ammonia playing the role of "water" of crystallization, and are known as amines or ammoniates and are soluble. With amino acids soluble compounds and soluble carbamino compounds of these metals are also formed.

In other words, the condition of an ammoniacal solution characteristic of such sludges, i. e. raw, digested, activated and mixtures of two or more thereof requires (a) that sufficient coagulant be added first to produce a chemical concentration of the coagulant sufficient to overcome the chemical reacting effect of the ammoniacal compounds present, whereupon (b) the additional excessive coagulant added is available to exercise the colloid flocculating function. By the present invention, wherein the removal of this ammoniacal condition is carried out preliminary to dewatering or coagulation and dewatering, optimal flocculation is obtained with a minimum of coagulant.

This definitely explains why some sewage sludges or sediments require a great deal more chemical reagents for final effective coagulation than do others from the same or from other localities. For instance, raw sludges may contain two hundred to six hundred parts of suspended solids to one of soluble ammonia derivative and ammonia nitrogen; mixtures of raw and activated sludges may contain less than one hundred to three hundred parts of suspended solids to one of soluble ammonia and ammonia derivative nitrogen; well digested sludges may contain seventy to ninety parts of suspended solids to one of soluble ammonia and ammonia derivative nitrogen; and digested sludges containing a small percentage of digested garbage may contain thirty to fifty parts of suspended solids to one of ammonia and ammonia derivative nitrogen.

The greater the number of suspended parts there are in any sludge to one part of soluble ammonia and ammonia derivative nitrogen, the smaller will be the quantity of ammonia and ammonia derivative nitrogen present and the smaller will be the quantity of coagulant necessary for producing a filterable floc; for then the coagulant used will flocculate more colloids and is not unnecessarily consumed in overcoming the chemical reactions with compounds of the ammonia and ammonia derivatives.

Sewage sludges containing digested garbage or in some cases, digested activated sludge require so much ferric chloride for coagulation, due to the relatively high amounts of ammonia and ammonia derivative nitrogen present, e. g. two thousand and more parts per million, that the cost of this reagent renders its use for coagulating purposes prohibitive. Other rather normal digested sludges containing six per cent solids and six hundred to eight hundred p.p.m. ammonia and ammonia derivative nitrogen (i. e. one part of this nitrogen to eighty-six parts suspended solids) can be treated with ferric chloride at an approximate cost of three dollars ($3.00) per ton of dry solids. I have reduced the ammonia and ammonia derivative nitrogen in this same sludge to one hundred parts per million, (or only one part of ammonia and ammonia derivative nitrogen to six hundred parts suspended solids), and found that the cost of ferric coagulant per ton of dry solids has been reduced to one dollar ($1.00). Again on activated sludges containing one part of this nitrogen to one hundred parts and less of suspended solids and requiring four dollars ($4.00) per dry ton of solids for ferric coagulants, I have found that the amount of coagulant necessary for equivalent dewatering can be readily reduced to two dollars ($2.00), per ton of dry substance by so reducing the ammoniacal compounds present that the ratio of solids to ammoniacal nitrogen is four hundred and six hundred to one. In fact, the reduction of the amount of soluble ammonia and ammonia derivatives present makes possible the use of lime and other cheaper coagulants without the drawback of overloading or overbulking the sewage sludges. This drawback led to the abandonment of the use of such cheap coagulants years ago.

The recent revival of this once abandoned practice and the effort to replace some of the lime necessary by using shredded newspapers and paper pulp and the widespread use of ferric chloride and ferric sulphate has come about in the modern effort to dewater sewage sludges on modern continuous suction filters which are much cheaper to operate than the old, batch type filters that required considerably more attention and labor for successful operation. Whereas, the cost of the filtering operation has thus been greatly reduced, the cost of chemical coagulants has remained quite high. In fact, the nature of some sludges and the cost of chemicals of treating same, and in some instances the cost of chemicals alone has kept a great number of disposal plants from the adoption of modern mechanical dewatering equipment. Sludge digestion and the dewatering of the digested sludges on extensive sand beds, where space is available, has been the result. But even with this treatment sludges are dried mainly by evaporation as they do not drain readily through such beds. As such a method depends on warm and dry weather it is seasonal, very slow and expensive.

This high consumption of chemicals and the consequent high cost of coagulating sewage sludges has been entirely due to the lack of understanding of the detrimental influences exercised by soluble compounds of ammonia, and ammonia derivatives, formed in the process of putrefaction in all sewage sludges. This lack of understanding has been partially due to the effort to retain the nitrogen in the final sludges, in order to render the finally dried product more valuable as fertilizer. This has been done at the cost of coagulants, wherever they have been used, thus very often making the cost of coagulating and dewatering exceed the price obtained for the fertilizer. However, in view of the fact that most of the detrimental nitrogenous compounds are in solution in the liquid, which is removed from the solids, my process of partially or totally removing these compounds that are so detrimental to economic coagulation, previous to dewatering on continuous filters, and which are likewise detrimental to rapid dewatering on the usual sand beds, offers the very decided advantage of material reduction in coagulation costs and sand bed filtration costs without materially destroying the fertilizing values of sludges in case these sludges are ultimately disposed of as fertilizers. The present tendency of sludge disposal is, however, final incineration, in which case the sludges produced by my process are easier to burn because they have been coagulated with less inorganic foreign matter than is now being used for final coagulation.

The removal of ammonia, ammonia derivatives and ammonia compounds totally or in amounts sufficient to render coagulation much more effective and materially cheaper than heretofore usual, can be cheaply and efficiently effected by any one or the combinations of two or more of the various methods to be specifically set forth. In fact, the products obtained from the digestion of sewage sludges can, if properly trapped and utilized, be used for such deammonification in the presence of the solids that are subsequently coagulated for final dewatering purposes. I refer for example to the production of formaldehyde from the methane resulting from digestion of the various sludges.

The ammoniacal products of putrefaction that are dissolved and flow in the main portion of liquid are customarily purposely oxidized by biochemical means to nitrites and nitrates and even removed by chemical means, after this main liquid portion has been removed from the sewage sludge itself, in order to render the final effluent relatively free of ammoniacal food for bacteria.

I am cognizant of existing processes for the biochemical and chemical removal of ammonia, and even for the ultimate recovery of ammonia, from the main portion of sewage waters after such waters have been separated from the sewage sludge itself before coagulation. Such processes, however, have for their sole purpose the ridding of the liquor of compounds that support bacterial growth. None of these processes relate to the removal of soluble compounds of ammonia and its derivatives from the so subsided sewage sludges themselves for the purpose of rendering the final sludges more fit for economical coagulation and final dewatering and drying, which is the subject of this invention.

Nature supplies an unlimited number of proteins in vegetable and animal matter, used as food stuffs. These proteins are not only broken down into amino acids in the process of animal digestion and metabolism, but the putrefaction of digested and other organic waste materials carried by sewage streams is a continued bacterial and enzymatic decomposition of the food residues in such waste and the remaining amino acids and other putrefactive products themselves.

The decomposition of proteins to amino acids is accomplished by hydrolysis, i. e. decomposition caused by water molecules entering into the reactions. Bacteria and their enzymes are by far the most fruitful in causing this hydrolysis. The amino acids are likewise hydrolyzed and the final products of such degradation in sewage sludges are simpler chemical entities, most of which are ammonia, ammonium salts of the simpler organic acids, ammonia derivatives, methane, carbon dioxide, carbonates, bicarbonates, hydrogen, etc.

However, all subsided sewage sludges contain products in various stages of this progressive decay and putrefaction, as they constitute a mixture of all forms of lower life metabolism with ammoniacal compounds as important end products.

The accepted formula for amino acids indicating the participating molecules is

R—CH—NH$_2$—COOH.

Individual amino acids differ in the character of the molecular group R.

Hydrolysis of these acids can decompose both the amino (NH$_2$) and the carboxyl (COOH) or organic acid group, i. e. the hydrolysis can proceed in either or both of two directions during decomposition.

If the amino group is broken off by hydrolysis from the amino acid, what is known as deaminization takes place, and ammonia and organic acids are formed, i. e., 1. 
R—CH—NH$_2$—COOH+hydrolytic agent= NH$_3$+R—CH$_2$—COOH Thus ammonium salts of organic acids will result. Such deaminization can also produce urea and finally ammonium bicarbonate.

If the carboxyl group is broken off from the amino acid by hydrolysis, thus forming carbon dioxide and amines, what is known as decarboxylation takes place, i. e.

2. 
R—CH—NH$_2$—COOH+hydrolytic agent= CO$_2$+R—CH$_2$—NH$_2$

These equations represent the two main directions of hydrolytic putrefaction or degradation of amino acids. If the two occur simultaneously, ammonium carbonate, bicarbonate or carbamino compounds can result.

The above hydrolytic processes take place if raw and activated sewage sludges are allowed to putrefy.

In the activation of all sewage directly after its arrival at any sewage disposal plant putrefaction is prevented temporarily by biochemical oxidation and the resulting biologically active sludge contains more bacterial proteins and amino acids than ammonium compounds. However, if the crude solids are first collected by subsidence in a primary sludge and some of the final biologically active sludge from activation sedimentation is mixed with such primary sludge, a highly putrefactive mixture results with proteins, amino acids and ammonium compounds present.

The decarboxylation process (2) is brought about more by anerobic bacilli and enzymes in the anaerobic digestion of activated or raw sewage sludges. Some decarboxylation accompanies the deaminization putrefaction of stored raw and activated sludges, and some deaminization accompanies the decarboxylation in digestion of these sludges. Consequently, the liquid immediately surrounding sludge particles can finally become enriched by the accumulation of soluble amino and ammonia compounds which react with the accumulating carbon dioxide to form carbamides, carbamino compounds, carbonates and bicarbonates of ammonia.

Thus raw sludge rapidly becomes relatively rich in organic acids through process 1. As this type of process originates mostly in the solid particles, it will be seen that these particles develop an active hydrogen ion, the solution tension of which readily renders the particles colloidally negative.

With so many amines and soluble salts, especially carbonates, etc., of ammonia, forming in digestion, the liquors surrounding the particles here become alkaline. The particles with their remaining mobile hydrogen ions adsorb, by exchange, negative carbonate and bicarbonate ions while other ammoniacal ions go into solution. The particles thus retain their negative colloidal charge by virtue of the outer negative adsorption layer.

Furthermore, just as ammonia and carbonic acid, formed by decarboxylation process (2) unite to form ammonium carbonate and ammonium carbamate ($NH_4OCO.NH_2$) the amino acids remaining can unite with the liberated carbonic acid through their amino groups to form carbamino acids. The salts of these carbamino acids formed with coagulants such as lime, alumina, ferrous and ferric compounds are not only water soluble, but unnecessarily consume coagulating ions without producing filterable flocs with the negative colloidal solids present. In fact, these soluble salts increase the viscosity of the solution sufficient to retard filtration.

The pH of stored raw sludge and primary activated sludge liquors may therefore, due to hydrolytic deaminization, and liberation of organic acids drop as low as 4.5 and the pH of digested sludge liquors, due to hydrolytic decarboxylation, and deaminization may increase to 8.0 according to the detention period of both in sewage treatment plants. Due to rapid biochemical oxidation of activated sewage and temporary prevention of any finally settled putrefaction during activation the pH of activated sludge may be about pH 7.0 to 7.5.

The water soluble amino and ammonia nitrogen in raw sludges will vary approximately from one hundred to five hundred parts per million in some disposal plants, depending on the amount of crude solids present, the length of detention time and the climatic conditions. In warm weather and climates the deaminization of raw sludges proceeds more rapidly and to a greater extent than in colder weather and climates.

In activated sludges consisting of the biologically active floc only the soluble amino and ammonia nitrogen may range from as low as twenty parts per million to eighty, depending on the concentration of the final sludge, the time of activation and climatic conditions. Stored activated sludges and primary sludges from activation plants may show the same soluble amino and ammonia nitrogen figures as raw sludges if allowed to putrefy.

In separate digestion tanks containing digested domestic sewage sludge, the soluble amino and ammonia nitrogen may approach one thousand p.p.m. In digested sludges from activated sludges and from raw sludges containing disintegrated garbage this figure may be considerably higher. After the ammonia content reaches a certain concentration in such sludges, it starts evaporating into the gas space above the sludge.

Thus the final sludge products in sewage sludges that must be coagulated by positive ions, have not only become negatively charged, but have likewise surrounded themselves with amino acid, carbamino, ammoniacal and other ammonia derivative products of putrefaction which all react with the coagulating ions and in a chemical manner that either (1) chemically consumes coagulating ions in the formation of new compounds, or (2) dissolves and renders difficultly filterable some coagulated colloids. If such detrimental ammonia, ammonia derivatives and ammonia and nitrogenous compounds are removed from the neighborhood of the colloids, very little flocculating agent is needed for producing a coarse and readily filterable floc.

Furthermore, the presence of the amino, ammonia and carbamino compounds in quantities usual in sewage sludges make it necessary, when using ferric ions for coagulation, to filter the resultant floc within a few minutes after the floc formation, otherwise these detrimental nitrogenous compounds, present and forming, will soon render the floc gelatinous and difficultly filterable. Therefore, removing these compounds by means of my process, partially or totally, renders the filterable floc more stable.

Another discovery in this respect is that with sludges that have been treated for removal of ammoniacal compounds by my process, the dangers of under or over-conditioning the sludges with ferric chloride and such coagulants, with the consequent material reduction in dewatering or filtration rates, are definitely lessened.

The terms diminishing or reducing the concentration of ammoniacal compounds include particularly the essential step of lessening the concentration of the aforesaid soluble ammoniacal compounds in the sludge or elimination of same from the sludge.

Referring to the drawings.

As heretofore stated, the principal purpose of this invention is to reduce or completely remove biochemical decomposition products resulting during the accumulation and detention of sludge, which decomposition products act to chemically transform and thereby lessen the efficiency of coagulating and flocculating agents normally used for dewatering sludges; whereby a coagulant or flocculant may be entirely omitted, or the amount thereof necessary reduced very materially over present requirements.

Figure 1:
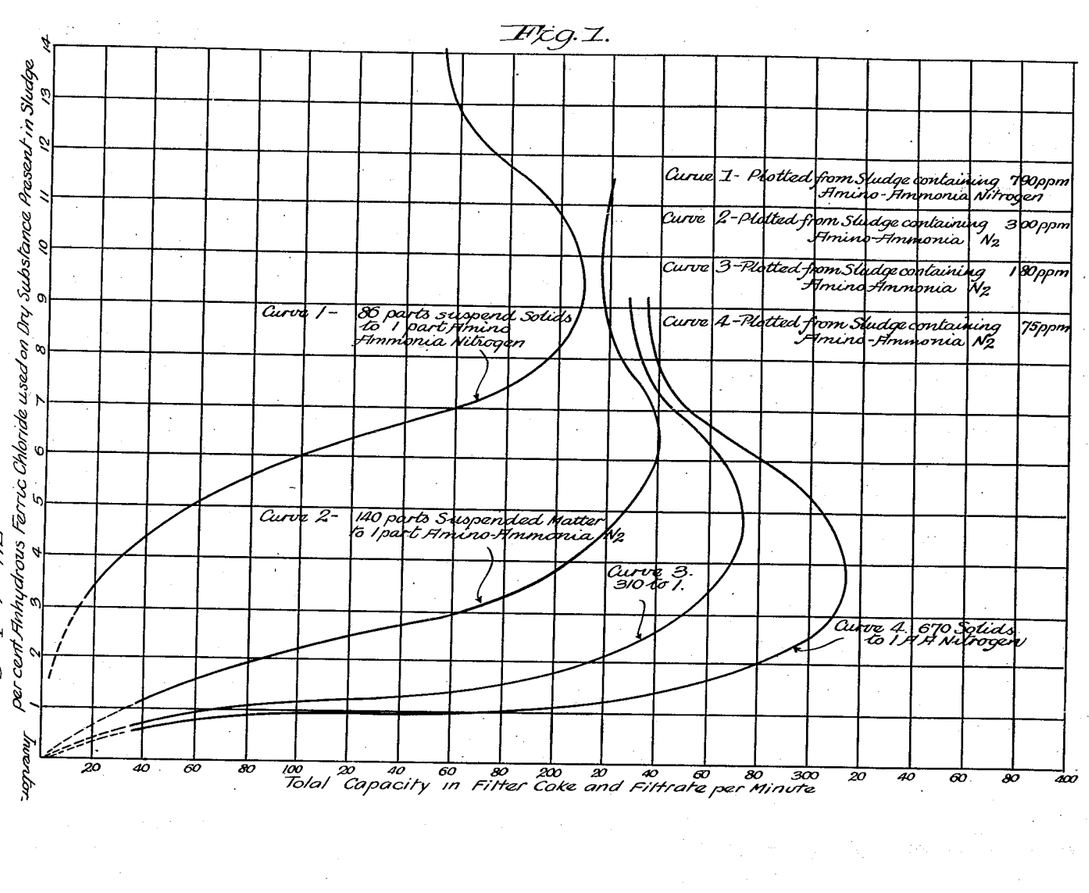
Figure 1 graphically illustrates the remarkable savings effected in coagulant by removal of soluble compounds of ammonia and ammonia derivatives from a typical sewage sludge. This figure also illustrates the fact that the amount of soluble compounds of ammonia derivative and ammonia expressed in amounts of nitrogen present in this same sludge after successive treatments for diminishing the ammoniacal compounds in such sludge governs the amount of coagulant required for proper coagulation.

Referring to Figure 1, the percentage of anhydrous ferric chloride added on dry substance in a certain sludge are plotted as ordinates. The resultant filtration capacities per minute of time, i. e. weights of total filtration products, meaning vacuum filter cake and filtrate resulting per minute from a constant filter area unit, are plotted as abscissa.

Curve 1 has been plotted from a sludge in which there were eighty-six parts of suspended matter to one of soluble ammonia and ammonia derivative nitrogen, most of which is ammonia nitrogen. The curve, like all others on the same graph, covers an entire range of filtration capacities at various ferric chloride additions. Thus, at five per cent ferric chloride addition on solids present in the sludge, the resultant filtration capacity per minute is about sixty weight units, and at nine per cent FeCl$_3$ addition, the resultant total filtration capacity per minute is two hundred and ten weight units of cake and filtrate. Above nine per cent, ferric chloride addition, the curve reverses itself and filtration becomes slower, due to the presence of excess ferric chloride which redissolves some of the floc produced and forms a more viscous filtrate.

Curve 2 has been plotted from the identical sludge from which the compounds of ammonia and ammonia derivatives have been partially removed by elutriation, so that there are one hundred and forty parts of suspended matter to one part of ammonia and ammonia derivative nitrogen. This curve, like all others, covers the entire range of capacities at various ferric chloride additions. For example, at practically one and one-half per cent ferric chloride addition on solids present with this treated sludge, the resultant total filtration capacity is the same as when using five per cent ferric chloride with the sludge shown on curve 1. Thus, about a sixty-two per cent removal of the detrimental ammonia and ammonia derivatives from the sludge results in a seventy per cent saving of coagulant.

Curve 3 has been plotted from the identical sludge which was given a further treatment for the removal of ammonia and ammonia derivatives, so that but one part of the nitrogen of these compounds remains for three hundred and ten parts of suspended solids. Curve 4 represents the results on the same sludge where there remains but one part of this nitrogen to six hundred and seventy parts of suspended solids. On curve 3, for instance, it will be seen that at a one per cent ferric chloride addition on solids present, the same filtration capacity is obtained as resulted when five times as much ferric chloride was added to the sludge represented on curve 1. Here the ammonia and ammonia derivative nitrogen has been reduced about seventy-seven per cent from what it was in the original sludge and about eighty per cent of the original coagulant has been saved in producing the same filterable floc. Therefore, the coagulant saved is easily in direct proportion to the amount of soluble ammonia and ammonia derivatives removed from the sludge. My discovery, therefore, not only reduces the cost of coagulation very materially, but at a reduced coagulant consumption will, likewise, produce more rapid filtration and consequently reduce the amount of filter area necessary and this in turn will reduce the cost of filtration equipment and operation.

If the soluble ammonia and ammonia derivatives are completely removed from any sludge at the isoelectric point of its suspended solids, i. e. at the point where these solids are neither predominantly positively or negatively charged, it will filter without the aid of any further coagulant. If slightly negative or positive, but a slight addition of acid salt or an alkaline agent, such as ferrous sulphate or lime is necessary to produce excellent filtration.

Sludges that are practically freed of soluble ammonia and ammonia derivatives will, if mixed with untreated sludges, cause a partial deammonification of the latter and result in the flocculation of the latter, in which case very little and frequently no further coagulant is necessary for dewatering by filtration. This particularly happens when I completely remove ammoniacal compounds from any portion of raw, digested or activated sludges by a thorough chlorination and elutriating treatment, in which case continued chlorination gives the colloids in this portion a positive charge. In mixing this deammonified portion, with the untreated sludge portion containing ammoniacal compounds and the negatively charged sewage sludge particles, it not only partially deammonifies the latter, but flocculates the same by electric discharge. However, this treatment requires more cost for chlorination than does the partial removal of ammonia and ammonia derivatives and compounds by the methods now to be described, which for mechanical dewatering purposes, are followed by small additions of well known and inexpensive coagulants.

A very economical procedure is to digest a portion of the sludge, diminish the concentration of soluble ammoniacal compounds in this digested portion, and add this deammonified digested portion to an undigested raw and/or activated sludge portion or portions. This results in a sludge mixture that requires remarkably small amounts of coagulant for effective flocculation and dewatering.

Thus as a result of my discovery and by consequent simple means, as will now be described, I am able to effect remarkable savings in coagulation agents and produce more effective dewatering, in mechanical devices, of all sludges produced in the various types of sewage disposal plants. If digested sludges are dewatered on sand beds, my process will render such sludges very easy to dewater on much less sand bed area than heretofore used, and this is true even if coagulants are eliminated.

Figure 2:
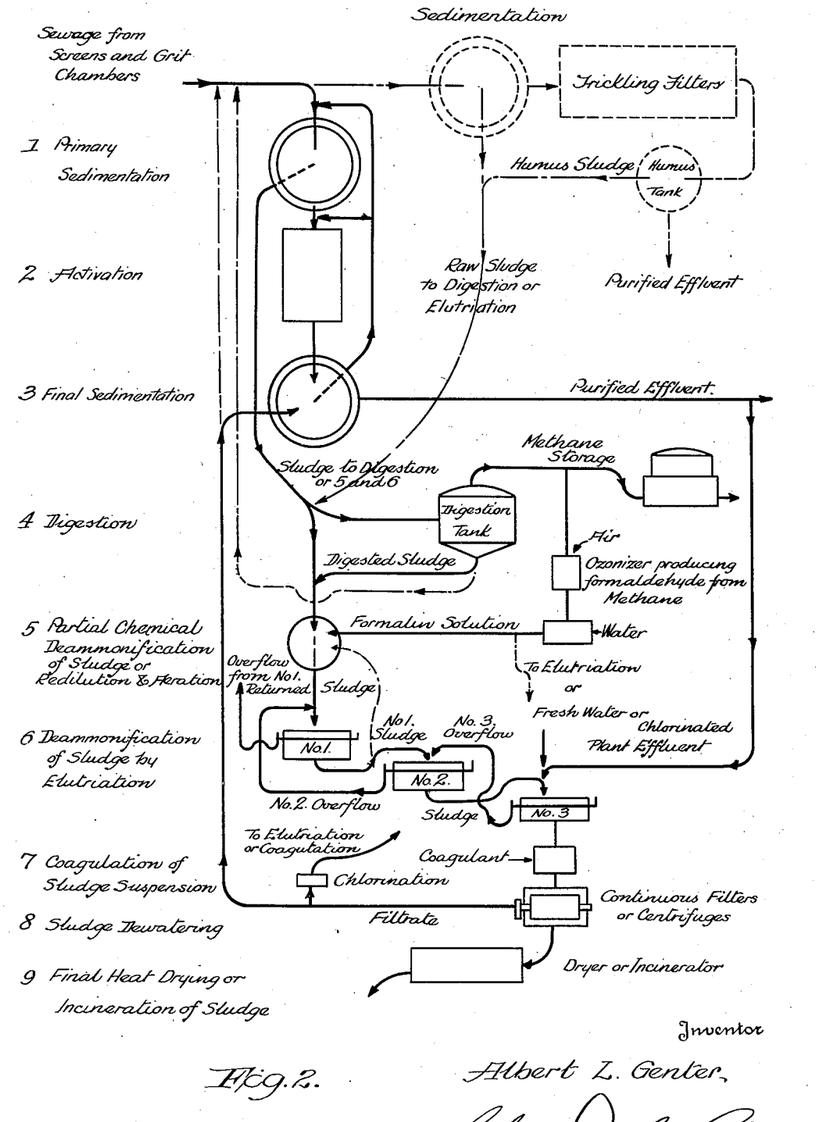
Figure 2 shows a flow sheet of any sewage disposal system embodying my process of removing soluble compounds of detrimental ammonia and ammonia derivatives from any type of sewage sludges by my process of elutriation, combined with the process of chemical treatment, if necessary.
Figure 3:
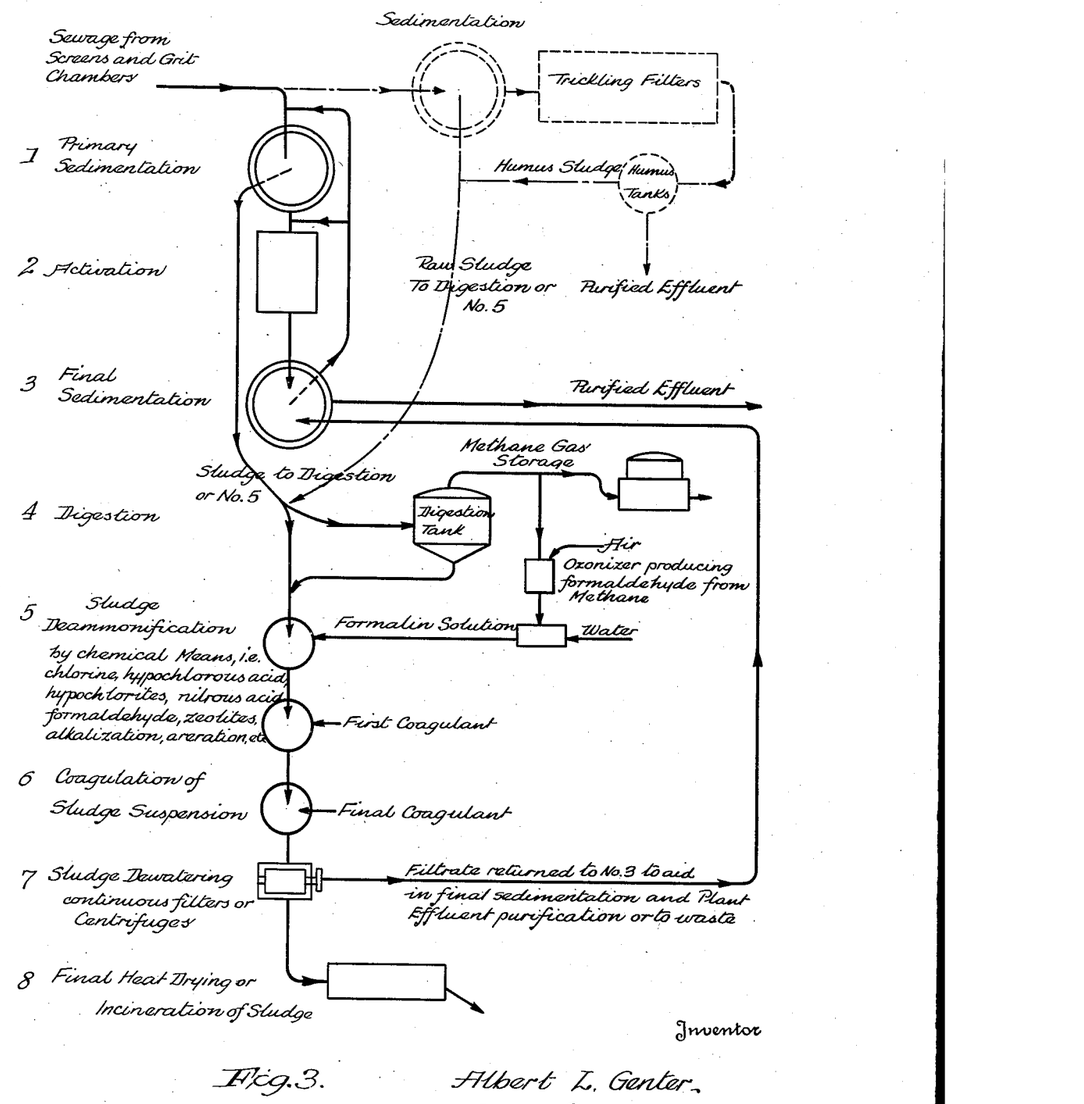
Figure 3 shows a similar flow sheet of sewage disposal plants of well known character embodying my process of chemically removing detrimental ammonia and ammonia derivatives and compounds from the sludges, regardless of the type of such sludges.

Referring to Figures 2 and 3, I have illustrated by flow sheets various embodiments of my invention and it is to be understood that any suitable apparatus can be employed.

Most sewage treatment plants in larger sanitary disposal districts are equipped with coarse bar screens for removing floating material, followed by skimming tanks for removing oil, grease and floating solids, and then grit chambers used to remove inorganic material such as sand and grit carried to the treatment works in the sewage. Any or all of this apparatus which precedes the sedimentation, activation, trickling filter, digestion or other essential treatment and disposal equipment, are not shown in the accompanying drawings as my invention is not concerned with the preliminary coarse or fine screenings, nor with detritus or grit of inorganic nature.

In plants using biological oxidation processes for the liquid portion, the sewage follows the course shown by dotted lines to a sedimentation chamber to separate most of the raw, or crude sludge from the main body of the liquid portion; the latter is then biologically oxidized in so-called trickling filters; again settled to remove final humus compounds, which latter are then mixed with the sludge from the initial sedimentation, and the purified effluent is discharged. In some biological activation plants, the course follows the full lines in which the sewage stream is given a comparatively short detention period and a large portion of the suspended crude organic solids is removed before activation; from this primary settling tank the sewage flows into the well known activation tank where it is mixed with a large fraction of bacterially active sludge obtained by subsidence from the completely activated sewage and thoroughly agitated with air for a given period after which the final activated mixtures flow into a final sedimentation tank where the biological floc is separated from the activated sewage and the clear or purified effluent is carried to waste; the settled bacterially active floc or sludge is removed from the final sedimentation tank and a greater fractional portion returned to the aeration tank for biological seeding purposes and the balance called "waste sludge" is introduced into the influent entering the primary settling tank, as before noted, from which a primary sludge consisting of a mixture of crude and activated sludges is removed, and sent to digestion or dewatering equipment.

In Figure 2, I have illustrated at 4 a digestion tank, in which all or a portion of the activated or raw sludge may be digested, and leading from the digestion tank, is a methane line communicating with a suitable methane storage chamber. The methane may be passed in any suitable manner from the chamber to an ozonizer or other oxidation means, and formed into formaldehyde which will be dissolved in water and returned to the system for accomplishing removal of ammoniacal compounds from the sludge, as shown at 5. As stated, all or a portion of the raw sludge sediment may be digested, or all or a portion of the activated sewage sludge may be digested. Moreover, portions of the raw or activated sewage sludges may be digested and then mixed with the main body of raw or activated sewage. All or a portion of the raw sludge may be treated for removal of ammoniacal compounds or all or a portion of the activated sludge may be given such treatment. Also, raw or activated sludges or portions thereof may be digested and then given such treatment for diminishing the concentration of ammoniacal compounds. Again, digested raw sludge or digested activated sludge may be mixed with main bodies of raw or activated sludge, or digested raw sludge or digested activated sludge may be mixed with digested or non-digested activated sludge and given a treatment for diminishing ammoniacal compounds.

In Figure 2, also, I have shown an elutriation system, wherein the sewage sludge or sludge mixtures as just described, pass from left to right and the elutriating water, comprising the effluent from any of the several sources shown and containing less ammoniacal compounds than the sludge under treatment, is passed from right to left. This counter-current washing step preferably takes place in one or several stages in suitable decantation tanks and is a continuous operation. In the present instance, I have shown three stages, but in some cases one will suffice or more than three may be used.

According to Figure 2, the elutriation of the sludge may be combined with a chemical treatment or the chemical treatment may be omitted and the elutriation constitute the sole step for diminishing the concentration of ammoniacal compounds. Elutriation may take place upon all or portions of activated sludges, raw sludges or digested activated sludges, or digested raw sludges, as well as mixtures of the same. Again, the chemical treatment may constitute the sole deammonifying treatment.

As stated, one or the other may be eliminated and, in some cases, in lieu of, or in addition to the step of chemical treatment, the chemical will be supplied to the elutriating water or other medium. As stated heretofore, the only condition regarding the elutriating medium which must be considered, is that it contain less ammoniacal or other compounds capable of reacting with the sludge to liberate soluble ammoniacal compounds than is present in the sludges to be treated.

I have indicated at 7 a coagulating operation, but in some cases this will be omitted, as where either the chemical treatment or the elutriation or both are sufficient to produce a filterable floc.

The flocculated sludge is passed through suitable continuous filters or centrifuges or other dewatering means and the cake is given a final drying or incineration, as the case may be. The filtrate, particularly where chemical treatment has been resorted to, i. e. chlorination, may be returned to the system either to the main sewage stream, the final sedimentation chamber or the elutriating tanks, as shown in Figure 2.

In addition to the steps set forth in the flow sheet shown in Figure 2, I may combine with this treatment the several processes set forth in my application Serial No. 645,485, filed December 2, 1932.

In Figure 3, I have illustrated a similar flow sheet to that shown in Figure 2, except that the elutriation step is omitted. The deammonification takes place in accordance with the process shown in Figure 3 upon activated, raw or digested sludges and mixtures thereof, as was the case with the process shown in Figure 2, and the diminishing of the concentration of ammoniacal compounds is carried out as a single or successive steps by chemical treatment as shown at 5.

It is to be observed that the filtrate from the sludge dewatering means shown at 7, may be returned to the final sedimentation chamber to aid final sedimentation and plant effluent purification or the purified effluent may be returned to the main sewage stream or used to redilute the sludge to elutriate the same.

As will be appreciated, the activity in the sewage sludge of decomposition products which chemically lessen the useful activity of flocculants and coagulants, is appreciably diminished by my process. The agents employed to accomplish this, and which will now be described in detail, do not, relative to their diminishing effect on the activity of the decomposition products, materially lessen the useful effects of the coagulants and flocculants. In this manner, substantially less coagulating or flocculating material need be employed.

*Removal of compounds of ammonia and its derivatives from sewage sludges by elutriation*

This very simple and most effective method shown diagrammatically in Figure 2, involves the washing-out of the soluble ammonia and ammonia derivative compounds from the various sludges, or sludge mixtures, by water dilution and thereby the diffusion of such dissolved compounds into the added water and re-concentration of the sludge through subsidence of same and decantation of the supernatant solution containing ammoniacal compounds or removing same by other equivalent means. Elutriation alone provides a remarkably effective method for removing the soluble ammonia and ammonia derivative compounds from raw, primary activated and digested sludges and mixtures of activated and raw, activated and digested, or raw and digested sludges. The chief requirement is that the water or other diluting and elutriating medium employed contain less ammonia and ammonia derivatives and compounds than the sludges treated, and such water is readily obtainable in all disposal plants. When elutriation is preceded or even accompanied by or followed by chemical treatment for removing ammonia and ammonia derivatives and compounds, according to any of the methods to be later described, it can be made even more effective and will result in very material reduction of chemicals required. In any case, my process of elutriation renders the removal of ammonia and ammonia derivatives and compounds from sewage sludges possible in disposal plants of any type and magnitude, so that final coagulation is no longer expensive.

The diffusion of soluble ammoniacal compounds from sewage sludges into comparatively pure water through porous membranes by dialysis or osmosis is a slower, and more expensive means of removing such ammoniacal compounds from sewage sludges. In view of the fact that the endosmosis of the pure water into the sludge through the membranes is more rapid than the exosmosis of the ammoniacal compounds from the sludge into the water, some dilution of the sludges results. Hence this procedure is nothing but a more refined elutriation process and is considered the equivalent of elutriation.

The simplest method of elutriation consists in thoroughly mixing the conventional concentrated final sludge or mixtures thereof with final purified plant water or any water that is relatively free of ammonia and ammonia derivatives and allowing the so diluted mixture to settle in a decantation tank or tanks followed by decantation of the supernatant solution that has become enrichened by diffusion of soluble ammoniacal compounds from the original sludge into same. In the initial process of conventionally concentrating sewage sludges in the settling tanks used in accepted sewage practice and in detaining these concentrated sludges, the concentration of the soluble ammoniacal compounds naturally increases due to the biochemical hydrolytic deamization and decarboxylation taking place within the sludge particles themselves.

I have found in practice that remixing such conventional sludges with two times their volume of water relatively free of ammoniacal compounds and allowing the solids to settle again and decanting the supernatant liquid, will remove one-half of the disturbing ammoniacal agents from the final new sludge, and according to Figure 1, I save one-half and more of the coagulants that would otherwise be used. By repeating this procedure but once, I have been able to produce sludges that contain, but one-fourth of the disturbing ammoniacal compounds and have as a consequence effected a seventy-five and eighty per cent saving in coagulants.

I have likewise discovered that digested and activated sludges mixed with raw sludges not only tend to increase the settling rate of the mixed sludges in the elutriation water, but the resultant elutriated sludge mixtures are so free of ammonia, compounds of ammonia and its derivatives, that they efficiently coagulate with a surprisingly low consumption of chemical coagulants. For example, by digesting a fraction of the raw sludge and remixing this digested material with the total raw sludge and elutriating the mixture either with fresh water or any of the plant water that is relatively free of dissolved ammoniacal compounds, a remarkably efficient method is provided for ammonia removal from the sludge previous to final coagulation and dewatering. The consumption of coagulants will then be but a fraction of that now used in plants employing such coagulants.

As before stated, I have likewise found that coagulant consumption can be materially reduced over customary practice by removing a portion of the raw or waste activated sludge, or a portion of a mixture of the primary settled raw and waste activated sludge from the sludge system and subjecting it to anaerobic digestion. The digested sludge portion is then elutriated in order to diminish its concentration of soluble decomposition products, and the elutriated portion is mixed with the untreated sludge portion. This procedure results in very definite coagulant savings when it is desired to produce a final sludge product containing undigested raw or activated sludges.

Counter-current decantation of sludges or sludge mixtures with such waters provides a simple and continuous method of so elutriating sewage sludges. It is performed in two or more continuous thickeners or decantation tanks, as is indicated on Figure 2, at point 6. The feed to thickener 1, is the conventional final sewage sludge or sludge mixture to be deammonified by elutriation. The sludge produced in this tank moves from the bottom of 1 to 2 and so on to 3. The elutriating water enters tank 3 with the sludge from tank 2 and the overflowing clear water from 3 proceeds to the inflowing sludge in tank 2, and the overflow from this tank proceeds to be mixed with the plant sludge flowing into tank 1. Thus, the sludge proceeds in the one direction and the elutriating water proceeds in the opposite direction, as is the case with such counter-current decantation methods used in the chemical industries. This system effects a maximum removal of the ammoniacal compounds from the various sewage sludges with a minimum consumption of elutriating water. However, any elutriating system may be effectively used as the amount of final sludge produced in any domestic sewage disposal plant is but a small fraction of the total inflowing sewage stream, i. e. approximately from one-quarter to one-half of one per cent in some American disposal plants. In others employing activation without digestion of the sludge, it may amount to one and one-half per cent. Therefore, the amount of elutriating water used for removing ammoniacal compounds from these final sludges and the amount of ammoniacal compounds in such elutriating water returned to the system for further biochemical oxidation, together with what is already in the stream, puts very little extra burden on the liquid purification system. This is especially true when elutriation is accompanied by or preceded by or followed by chemical means for such removal of ammoniacal compounds. In fact, the use of formaldehyde as outlined in these specifications or the use of chlorine or hypochlorites in removing such compounds from the final sludges aids in the purification of the main plant liquid stream.

If the elutriation water which may be plant effluent or any other water is chlorinated, i. e., made into a weak chlorine water either by the action of chlorine direct or slight hypochlorite additions, it becomes remarkably effective as an agent for chemically removing ammonia and ammonia derivatives, while the main bulk of water serves as an elutriating agent. This procedure produces excellent results on activated and raw sludges and if carried far enough will so completely remove the soluble ammonia and amino acid compounds from these sludges that a filterable floc results.

In view of the fact that elutriation of various final conventional sewage sludges and re-concentration of these sludges so effectively removes most of the ammonia and ammonia derivative compounds, that are detrimental to the economic coagulation, I have found the practice of elutriation of further particular value when ferric salts are used for final coagulants of the elutriated sludges. In removing the disturbing ammonia and ammonia derivative compounds from the sludges, the added ferric coagulant is freer to act alone on the negative colloids present. In thus reacting with these negative colloids the ferric ions present discharge the negative charge on some organic colloids by giving up an electron and the ferric ions are thereby reduced to ferrous ions and remain as such in solution. Therefore, when the sludge is dewatered, the clear effluent from the dewatering filters contains some ferrous ions. If the ammonia and ammonia derivative compounds had not been removed from the sludge not only more coagulant would have been necessary for ultimate coagulation of the sludge, but all of the ions would have been consumed in such a manner that less ferrous ions would be present in the final filtrate after dewatering of the sludge than are present when using my process.

Therefore, if the filtrate obtained from the dewatering of sludges that have been elutriated and coagulated with small quantities of ferric salts in accordance with this invention, is used as a source of chlorine water, i. e. if this filtrate is chlorinated for use at elutriating water or admixing to sludge that has already been elutriated with other water and reconcentrated, it has an added value in further saving ferric coagulant, because in chlorinating such a filtrate containing ferrous ions, these ions are rapidly oxidized to ferric ions when chlorine is introduced. Thus, by reintroducing this chlorinated filtrate either for elutriation purposes, or using this chlorinated filtrate as the final coagulant or for mixing with elutriating water in counter-current decantation tanks 3, Fig. 2, the ferric ions present cause considerable coagulation of the sludge and consequently materially aid in resedimentation of the elutriated sludge, produce a clear elutriate and aid in further reducing the quantities of ferric coagulants ultimately used previous to dewatering the sludge. This procedure has enabled me to reduce the amount of ferric coagulants to less than one per cent on dry suspended colloids present in some sludges which is but one or two parts of ferric coagulant to one million parts of original sewage when coagulating some activated and raw sludges that have been so elutriated and less than one part of ferric coagulant per million of original sewage when coagulating elutriated digested sludges.

Due to the fact that a certain percentage of digested and finally settled bacterially active sludges from activation or mixtures of same added to raw sewage aid in the settling of suspended crude solids of raw sewage, and due to the fact that the consequent mixing of digested and activated sludges into raw sewage will wash out the soluble compounds of the ammonia and ammonia derivatives from these admixed sludges, I have found that returning a portion of such digested sludges or mixtures or portions of digested and activated sludges, or digested activated sludge, to the fresh inflowing sewage stream is an effective elutriation method. This is particularly true where continuously operating settling tanks are used for settling the various types of raw sludges away from the main body of sewage liquid. In view of the fact that remixing digested and activated finally settled sludges with raw sewage produces a mixture that readily settles and is elutriated by the incoming raw sewage water which contains a relatively small amount of soluble ammoniacal products at this stage, such sludge mixtures should be removed from the settling tanks as the sludge settles, otherwise unduly detaining the returned digested sludge in the settling tanks with fresher raw sludge and/or activated sludge causes both of the latter to start digesting in the settling system. The so flocculated and elutriated sludge mixtures are remarkably easy to coagulate with small amounts of coagulants. Only one-third or less of the final sludge or sludge mixture so elutriated need then be digested for returning to the sludge settling and elutriation system, thus eliminating a large percentage of the digestion space now in use in some plants and rendering the main portion of the elutriated sludge immediately ready for economic flocculation and dewatering. This alternative is shown on Figure 2 by the dotted line connecting the digestion tank with the inflowing sewage stream and is likewise particularly effective when combined with the chemical deammonification to be later discussed and also shown in Figure 2.

I also return some of the deammonified sludge to the main system together with the digested untreated portion to aid in settling and deammonification of the entire sludge.

*Removal of ammonia and ammonia derivative compounds by chemical means from sewage sludges.*

Referring to Figure 3, I have illustrated at 5, the deammonification step as accomplished by chemical means. This chemical treatment may constitute the sole means of deammonifying the various sludges and sludge mixtures or as heretofore indicated be combined with the elutriating treatment as shown in Figure 2.

I am aware of the fact that chlorination is extensively used in sewage plants for purification purposes, i. e. for destroying odors of putrefactive products and destroying or retarding bacterial activity in liquid sewage effluents after sludge subsidence, in order to prevent stream and water supply pollution. Chlorination is likewise occasionally used for deodorizing dewatered or partially dewatered primary or raw sewage sludges as for instance in such devices as is disclosed in the Linden British Patent No. 130,830. However, this employment of agents containing available chlorine is practiced for a purpose entirely different from that purpose outlined in the following. Here I apply such agents containing available chlorine to final sewage sludges, previous to any dewatering steps, so that subsequent coagulation and dewatering can be economically effected, or so that the very soluble ammonia salts or compounds formed by such chlorination can be more readily removed from the so treated sludges by elutriation, followed by re-subsidence of the sludges, coagulation and dewatering. Hence I apply such agents solely for partial deammonification purposes and any ammoniacal disinfectants incidentally produced by my process can be removed from the sludge very readily by elutriation and returned to the main plant stream, thus reducing the amounts of such chlorination products that may be normally used for deodorizing and purification purposes, or any surplus liquids containing available chlorine may be returned to the elutriation system and flow from there to the main plant stream.

(1) *Chlorination.*—This can be accomplished by the direct action of chlorine gas, chlorine water, hypochlorous acid or hypochlorites and such well known chlorinating agents on any final sewage sludge ready for dewatering. They all act primarily on the ammonium carbonates and ammonium salts, carbamino compounds, amino compounds and other parent substances of ammonia compounds found in various domestic sewage sludges.

Chlorine gas introduced to sludges deammonifies by partially liberating some nitrogen, or forming some ammonium chloride and ammonium hypochlorite, which latter rapidly decomposes to form monochloramine. As such ammonium salts and chloramines are readily soluble, they are easily removed by elutriation.

Monochloramine is a very powerful disinfectant. This decided agent against pollution and putrefaction is thus produced as a by-product when using chlorine and chlorine water in my deammonification process.

The use of chlorine water which contains dissolved chlorine, some hydrochloric acid and some hypochlorous acid is particularly advantageous in my process in that chlorine in the presence of hypochlorous acid acts on ammonium compounds to liberate nitrogen and form monochloramine especially in the ammonia dilutions encountered in sewage sludges.

If the mixture with chlorine water is rapidly accomplished some hydroxylamine dichloride is formed which forms water insoluble precipitates with iron or calcium coagulants instead of dissolving them as do ammonia salts, certain ammonia derivatives and carbamino compounds.

A further advantage of using chlorine water and particularly chlorinated final filtrate has been set forth in connection with the elutriation step as a more thorough means of removing ammonia and such compounds for flocculation purposes and particularly for hastening elutriation and aiding in further saving of coagulants.

The action of hypochlorites such as the well known bleaching line ($CaCl.OCl$ or $Ca(OCl)_2$) have a similar action to that of hypochlorous acid. Calcium hypochlorite acts on ammonium carbonates and bicarbonates present in digested sludges approximately as follows:

and the HOCl reacts to liberate some nitrogen and form the final monochloramine again as already pointed out. As some calcium carbonate is formed during this reaction under alkaline conditions, it flocculates some negative colloids as does the bivalent calcium chloride, as soon as the ammonia and carbamino compounds present are converted into products that no longer form soluble compounds with it. Thus, the use of hypochlorites primarily for partial removal of ammonia and ammonia derivatives from digested sludges has two incidental and important advantages, (1) the ultimate production of a powerful disinfectant, and (2) the formation of coagulants.

Due to the tendency of any single chlorinating agent to form ammonium chloride from amino acids and such products in sewage sludges, I have found it particularly advantageous in practice to combine the above reagents, i. e. to chlorinate as well as add hypochlorites and hypochlorous acid. By adding hypochlorites to the sewage sludge before or after diffusing chlorine through the sludge, the chlorine gas aids in liberating hypochlorous acid from the hypochlorites added and formed as above indicated and a more thorough oxidation and removal of ammonia and its derivatives takes place with very small quantities of hypochlorites and chlorine. For the same weight of chlorine, hypochlorous acid (HOCl) has double the oxidizing power that is possessed by chlorine water.

When using either ferric chloride or ordinary copperas and lime as coagulants, I have found the use of chlorine and calcium hypochlorite for the partial removal of ammonia and its derivatives so effective that the amount of these coagulants, used for effective final dewatering of sludges on continuous filters to be reduced to one half of the amounts ordinarily used on the same sludges without the deammonifying treatment. In this treatment, but one half of one per cent of chlorine gas and the same amount of available chlorine in the hypochlorite, calculated on dry solids present was used. This is but one or two parts of total chlorine per million parts of original raw sewage entering the plant.

When using chlorinating agents such as hypochlorites and chlorine for the diminishing of concentration of ammoniacal compounds in sewage sludges together with ferrous or ferric salts such as copperas, ferric chloride or ferric sulphate for coagulation of such sludges I have found the following procedure to be particularly effective: The ferrous or ferric coagulating agents are added first or together with hypochlorites and then the mixture is treated with chlorine gas to liberate further chlorine or hypochlorous acid from the added hypochlorites thus diminishing the concentration of ammoniacal compounds and aiding in the flocculation caused by ferrous or ferric ions already added and present and to keep said ferrous or ferric coagulants oxidized. Furthermore, the presence of ferrous and/or ferric salts when chlorinating hypochlorites in solutions of ammoniacal compounds, found in such sewage sludges, acts as a catalytic agent in rapid deammonification by nitrogen liberation. If lime is also used as an additional coagulant its addition should follow as a final step.

Hypochlorous acid can be readily made and used as made by passing chlorine gas through water in which crushed lime stone ($CaCO_3$) is suspended or through a tower packed with lime stone pieces over which water circulates.

The escaping carbon dioxide gas can then be used as a final coagulant, as described in my copending application Serial No. 645,485.

Calcium hypochlorite can likewise be readily made by diffusing chlorine through a thin milk or lime suspension when an alkaline hypochlorite liquor containing some hypochlorous acid and calcium bicarbonate results.

If the sludge is heated in the presence of such hypochlorites and hypochlorous acid the ammonium salts present are deammonified more completely by the liberation of nitrogen as gas, i. e.

$$3Ca(OCl)_2 + 4NH_3 = 3CaCl_2 + 6H_2O + 2N_2$$

Hypobromites have the power of doing this type of deammonification at ordinary temperatures.

The filtrate from the final dewatering of the so partially deammonified and finally coagulated sludges contains the powerfully disinfecting chloramines and is therefore preferentially returned to the inflowing sewage as an aid to its purification, or, as before noted, it may be returned to elutriation in cases where such is employed, i. e. either follows or accompanies chemical deammonification.

The soluble and insoluble amino acids in the sewage solids and the sludge liquors are the main parent substances from which the more disturbing ammonia salts and carbamino compounds spring. Chlorine and hypochlorites act in two ways on such amino compounds. The amino group and the carboxyl group characterize the amino acids. The amino group behaves as a base and the carboxyl group behaves as an acid. Therefore, chlorine and acids act on the basic or amino group; and bases, such as calcium hydroxide and even metals act on the carboxyl groups and form salts. The oxidizing action of hypochlorous acid and hypochlorites therefore readily replaces the amino groups.

Amino acids are converted to aldehydes by hypochlorites.

$$2R.CH.NH_2COOH + Ca(OCl)_2 + H_2O =$$
$$2RCHO + 2NH_4Cl + CaCO_3 + CO_2$$

The ammonium salts so formed are then readily converted into nitrogen and chloramine as already indicated by combining hypochlorite treatment with chlorination or, being very soluble, are readily removed by elutriation which may follow hypochlorite treatment. The aldehydes so formed react with ammonium salts to form aldehyde ammonias or methylene substitution products. A less vigorous chlorination will oxidize amino acids to cyanides or nitriles of the R. group present.

$$R.CH.NH_2COOH + 2Cl_2 = R.CN + 4HCl + CO_2$$

(2) Removal of ammonia compounds and amino acids by nitrous acid

When nitrous acid acts on ammonium compounds and amino acids both the nitrous acid and the ammonia or amino compounds are decomposed and nitrogen is given up by all reacting substances.

1. $NH_3 + HNO_2 = N_2 + 2H_2O$
2. 
$$R.CH.NH_2COOH + HNO_2 =$$

$$R.CH.OH.COOH + N_2 + H_2O$$

Thus the removal of all disturbing ammoniacal compounds is quantitative.

Since nitrous acid cannot be preserved in solution it is generated directly in the sludge by adding sodium or other nitrites to the sludge and then adding any inexpensive acid to obtain a slight acidity.

Nitrites are readily obtained by heating the commercial nitrates. Very small amounts of any nitrite and commercial acids or nitre cake liquor will remove ammonia and amino nitrogen from sewage sludges to an extent where remarkably little coagulating agents are required. The action of dilute sulphuric acid itself on amino acids is similar to that of hypochlorite and thus it materially aids when used with nitrites.

(3) Removal of ammonia and amino acids by formaldehyde

An approximately neutral solution of formaldehyde (HCHO) acts exceptionally different from the higher aldehydes. It completely deammonifies and removes amino groups by condensation with the ammonia and amine groups forming a methylene group ($CH_2$) and liberating corresponding acids, thus materially aiding in subsequent coagulation. With ammonium salts, such as occur in sludges, the reaction is:

$$2(NH_4)_2CO_3 + 6H.CHO = (CH_2)_6N_4 + 2CO_2 + 8H_2O$$

The carbonic acid so formed is an excellent reagent for coagulation with lime after the detrimental action of the ammonium ions has been removed. If ammonia is present as an organic acid salt, the organic acid is liberated instead of carbonic acid.

With amino acids which occur in sludges, the reaction is:

$$R.CH.NH_2COOH + H.CHO =$$

$$R.CH.N.CH_2COOH + H_2O$$

The basicity of the amino group and its disturbing influence disappears and the acid character of the carboxyl group becomes evident. The resulting acids readily form filterable flocs with lime and other coagulants, or so increase the hydrogen ion concentration of the sludge that flocculation with ferric chloride is readily accomplished with low coagulant consumption.

I have discovered that elutriation materially aids in such deammonification by formaldehyde. Certain of the deammonification products formed by formaldehyde treatment tend to chemically react with ferric coagulants. Hence, if a sludge is thoroughly mixed with formaldehyde solution and allowed to stand several hours until the deammonification reaction is practically completed and the so deammonified sludge is then elutriated, a final sludge is obtained which can be coagulated with remarkably small quantities of coagulants. Elutriation not only reduces the amount of formaldehyde necessary for obtaining excellent sludge deammonification but the use of formaldehyde likewise reduces the amount of elutriating water necessary.

I have discovered that sludge digestion produces a means of very cheaply obtaining formaldehyde. The digestion gases contain approximately seventy per cent by volume of methane and thirty per cent carbon dioxide. Methane is the only hydrocarbon that can be oxidized at ordinary temperature to formaldehyde by mixing with ozonized air. The presence of carbon dioxide is beneficial to this reaction. Thus, by passing digestion gas into ozonized air which is cheaply produced by an ordinary ozonizer, or by incompletely burning the methane and in turn passing this gas containing formaldehyde through water, a solution of formaldehyde of sufficient strength for treatment of sludges is obtained. Thus, by incomplete combustion or ozonation of one of the products of sludge putrefaction, i. e. methane gas, I am able to produce a reagent that is effective in removing ammonia and amino compounds. It is of further benefit in using this formaldehyde to provide a surplus, either in the sludge liquor or in water absorption, as it is a powerful germicidal agent for purifying the balance of the main sewage flow.

(4) *Deammonification of sewage sludges by the use of zeolites*

Although the use of zeolites or exchange silicates has been proposed for the removal of ammonia from the clarified sewage plant waters after all sludge has been removed from such waters, such zeolites are used in my process for removing ammonia compounds from the liquid surrounding the sludge particles, in order to thereby reduce the amount of final coagulants necessary for economic dewatering of such sludges. This method of ammonia removal is particularly useful with digested sludges and mixtures of raw, activated and digested sludges, especially if combined with elutriation.

(5) *Deammonification of sewage sludges by alkalization and aeration*

Rendering sludges slightly alkaline with a small amount of lime or other alkalizing agents and diffusing compressed air through the slightly alkaline sludges will likewise displace the ammonia which counteracts efficient coagulation.

This procedure depends on the chemical liberation of free ammonia from ammonium salts and is effective in reducing the amounts of final necessary coagulants and is most effective when followed by elutriation.

(6) *Removal of ammoniacal compounds in raw sludges by aerating and elutriation*

I have discovered that the following method of mixing a small amount of aerated and elutriated raw sludge with a large amount of conventional final raw sludge or primary sludge greatly aids elutriation and washing out of soluble compounds of ammonia and amino acids from the mixture and greatly reduces the amounts of total soluble ammonia and amino acids in the entire mixture and produces a sludge that is readily dewaterable with surprisingly low amounts of coagulant.

The final concentrated or settled raw or crude sludge obtained by conventional methods ahead of actual sewage activation is mixed with any desired smaller proportion of settled and previously elutriated and aerated raw sludge or biologically active sludge and diluted with plant or other water containing but less soluble amino acid and ammonia compounds than the mixture, and the mixture is then thoroughly agitated by dispersing air through same. The air agitation with simultaneous elutriation serves a treble purpose, (a) the soluble ammonia and ammonia derivatives are diffused away from the suspended raw sludge particles into dilute solution, (b) the soluble ammonia compounds are rapidly oxidized by the aeration accelerating biochemical oxidation of these compounds to nitrites and nitrates, and (c) the resulting sludge after a short time, i. e. fifteen minutes to an hour or more in some instances, is so flocculated that it readily settles away from the elutriating water which may still contain unoxidized ammonia compounds and which may be readily withdrawn from the settled sludge which contains a very low amount of soluble ammonia and ammonia derivatives. With mixtures of primary raw and aerated raw sludges wherein the original raw sludge contained as high as three hundred and fifty parts per million of nitrogen from soluble ammonia and ammonia derivatives, I have by this elutriation and aeration method, followed by reconcentration of the aerated and elutriated raw sludge, been able to rapidly produce a reconcentrated sludge containing but forty to sixty ppm. soluble ammonia and ammonia derivative nitrogen. In this one aeration and elutriation step, I have consequently reduced by eighty to ninety per cent the amounts of coagulants necessary for rendering the original untreated sludge mixture readily dewaterable. This procedure enables some disposal plants to economically dewater the raw sludge direct by simply activating a small portion of the raw sludge itself when diluted somewhat in plant water and mixing the main bulk of the raw sludge with this activated portion, rediluting with elutriating water containing less soluble ammonia and ammonia derivatives than the sludge mixture, agitating the mixture so diluted, with air, reconcentrating the aerated and elutriated mixture into a sludge of greater solid content, returning a portion of this elutriated and activated sludge to the treatment of new raw sludge, dewatering the balance and returning the effluents from dewatering and elutriation to the main liquid stream. Raw or crude sludge can likewise be treated with digested and the customary type of activated sludges and the sludges from humus settling tanks after trickling filters.

As formaldehyde, added in small amounts to sludge containing amino acids, favors cyanic acid formation from such amino acids, in the presence of oxygen, it is advantageous to add formaldehyde to the subsided sludges, mentioned in the foregoing, either previous to or simultaneous with air agitation and consequent oxidation. The cyanic acid so formed readily hydrolyzes to urea, ammonium cyanate and finally to ammonium carbonate and ammonium bicarbonate, which products are then easily separated from the sludge during the simultaneous aeration and elutriation step outlined in the foregoing.

This activation of rediluted, conventional, raw (non-activated) sludge itself is not to be confused with the customary activation process, wherein after subsidence of the crude or raw sludge the entire sewage stream together with all remaining soluble and colloidal organic matter is activated together, in order to biochemically purify the liquid portion itself and then the final biologically active floc settled away from this main stream or purified liquid and returned to the primary raw sludge; nor is it to be confused with activation processes having no primary subsidence of raw sludge.

In Fig. 2 this simultaneous redilution and aeration of the initial raw sludge from the sedimentation system, or of the final activated or digested sludge, or of mixtures of raw, activated and digested sludges can take place in the tank shown at step No. 5. Thus the sedimentation tank No. 1 at step No. 6 will then serve as the final sedimentation tank and a fraction of the reconcentrated aerated and elutriated sludge issuing from this No. 1 tank can be returned to No. 5, as indicated by dotted line, while the balance of the reconcentrated, aerated and elutriated sludge from No. 1 is dewatered or coagulated and dewatered.

In Figures 2 and 3, the flow sheets disclose steps 1, 2, 3 and 4, representing diagrammatically the usual types of sewage disposal system. Where activation is not used, the system shown in dotted lines is customary for the biochemical oxidation and purification of the main liquid portion of the sewage flow.

Referring to Figure 3, in some plants steps 6, 7 and 8, i. e. coagulation, filtration and drying or incineration are used to dewater and dispose of the final sludge, otherwise the digested sludge is run onto sand beds without coagulants for final dewatering.

Step 5, in Figure 3, shows various means of removing the ammonia and ammonia derivative compounds of raw, activated or digested sludges and mixtures of the same by any chemical agents according to my invention. Steps are also shown for producing formaldehyde from a portion of the digestion gases, so that this formaldehyde may be used for the removal of ammonia and its derivative compounds in any of the sludges produced in the plant and for further purifying the plant effluent.

Referring again to Figure 2, this flow sheet illustrates the very effective means for removing ammonia and its derivative compounds by elutriation, step 6, which may or may not be preceded by or combined with the chemical means of so reducing the quantities of ammonia and its allied compounds, as illustrated in Figure 2. Also, the alternative elutriation step of returning digested sludge to the plant influent (see dotted line from step 4, digestion tank, back to plant influent), in order to mix this sludge with the inflowing raw solids and to elutriate the entire mass is shown, and the alternative of aerating the conventional plant sludges and elutriating the same is likewise shown.

If the removal of ammonia by alkalization and aeration is practiced, this step will take the place of 5 in either flow sheet. If it is used in Figure 2, elutriation will, in some cases, follow such treatment.

Local conditions and the amounts of dissolved ammonia and allowed compounds in the sludges and the desired degree of their removal for either the final saving of coagulants or sand bed area will determine the adoption of any single procedure for the removal of such compounds, or the adoption of various possible combined procedures.

Thus, according to my invention various procedures which are inexpensive, or the combinations of two or more, may be used for partially or totally removing the compounds of ammonia and its derivatives from various sewage sludges, in order to render these sludges more readily dewaterable; and, in cases where final coagulants are used, to permit such coagulants to react with the sewage solids and colloids without being unnecessarily consumed by dissolved compounds of ammonia and its derivatives and without having such compounds render the coagulated mass relatively unfilterable in the presence of coagulants ordinarily used.

My process of so treating sludges thus provides remarkable savings in filter area and in the amounts of coagulants now used and proposed for the coagulation of sewage sludges and thus makes possible the dewatering of sewage sludges more efficient where sand beds are used and brings the use of mechanical dewatering device well within the economic range of all disposal plants.

Incidental, but equally important, advantages of my process, lie in the fact that the liquids returned from removing the ammonia and ammonia derivative compounds by means of using chemicals or elutriation aid in the purification of the final plant effluent.

By "filtration" in the appended claims is meant the separation of any liquid fraction of the sludge from the solids. This may be accomplished by any satisfactory and conventional process or apparatus. The term "filtration" is inclusive of operations on sand-beds, mechanical filters and centrifuges, as well as gravity separation, and in fact, is intended to cover any means of separation, draining, or straining.

I claim:

1. The process of dewatering sewage sludge containing biochemical decomposition products resulting during the normal accumulation and detention of the sludge ready for dewatering, comprising treating the sludge with an agent which does not of itself substantially chemically lessen the useful activity of sludge coagulating agents and which appreciably diminishes the concentration of biochemical decomposition products in the sludge which chemically lessen the useful activity of sludge coagulating agents, adding a coagulant and dewatering the sludge by filtration.

2. The process of dewatering sewage sludges containing biochemical decomposition products resulting during the normal accumulation and detention of the sludge ready for dewatering, comprising chemically treating and elutriating the sludge for diminishing the concentration of biochemical decomposition products in the sludge which chemically lessen the useful activity of sludge coagulating agents, adding a coagulant and dewatering the sludge by filtration.

3. The process of dewatering sewage sludges containing biochemical decomposition products resulting during the normal accumulation and detention of the sludge ready for dewatering, comprising elutriating the sludge for diminishing the concentration of biochemical decomposition products in the sludge which chemically lessen the useful activity of sludge coagulating agents, adding a coagulant, and dewatering the sludge by filtration.

4. The process of dewatering sewage sludges containing biochemical decomposition products resulting during the normal accumulation and detention of the sludge ready for dewatering, comprising treating the sludge with a chemical agent which does not of itself substantially chemically lessen the useful activity of the sludge coagulating agents and which appreciably diminishes the concentration of biochemical decomposition products in the sludge which chemically lessen the useful activity of sludge coagulating agents, adding a coagulant and dewatering the sludge by filtration.

5. The process of dewatering sludges containing biochemical decomposition products resulting during the accumulation and detention of the sludge prior to dewatering, comprising elutriating a crude sludge with a washing liquid and producing a final sludge having a lesser concentration of decomposition products than the original sludge, adding a coagulant and dewatering the sludge by filtration.

6. In the dewatering of waste activated sludges, the process which comprises elutriating a final waste activated sludge ready for dewatering with a washing liquid containing less decomposition products than the sludge, adding a coagulant to the washed product and dewatering by filtration.

7. In the dewatering of sewage sludges, the process which comprises elutriating digested sludge, adding a coagulant and dewatering the sludge by filtration.

8. The process of treating sewage sludges comprising treating the sludge with formaldehyde to diminish the concentration of ammonia and amino acid compounds resulting from biochemical decomposition of the sludge, adding a coagulant and dewatering the sludge by filtration.

9. In the dewatering of sewage sludges, the process which comprises treating the sludge with formaldehyde and elutriating the sludge, adding a coagulant, and dewatering the sludge by filtration.

10. In the dewatering of sewage sludges, the process which comprises treating the sludge with formaldehyde and elutriating the so treated sludge, and dewatering the sludge by filtration.

11. The process of treating sewage sludges which comprises elutriation of said sludge with water containing available chlorine, adding a coagulant and dewatering the sludge by filtration.

12. The process of dewatering sewage sludges containing biochemical decomposition products resulting during the accumulation and detention of the sludge ready for dewatering, comprising treating the sludge with an agent containing available chlorine and elutriating the sludge, adding a coagulant, and dewatering by filtration.

13. A process of treating sewages containing ammonia and amino acids and compounds thereof resulting from biochemical decomposition characterized by converting the $NH_3$ and $NH_2$ groups of these substances into methylene derivatives and liberating the acid character of the compounds of ammonia and amino acids by treating said sewages with formaldehyde solution, concentrating the solids into a sludge and dewatering the sludge by filtration.

14. The process of dewatering sewage sludges comprising repeatedly treating the sludge with an elutriating liquid, forming a final sludge, adding a coagulant and dewatering the sludge by filtration.

15. The process of dewatering sewage sludge comprising repeatedly treating the sludge in separate tanks with an elutriating liquid, decanting the liquid from one of the tanks and passing it to another tank to elutriate the sludge, adding a coagulant and dewatering the sludge by filtration.

16. The process of treating sewages which comprises concentrating the solids into a sludge by sedimentation in a tank, elutriating the sludge with a washing liquid to lessen the concentration of biochemical decomposition products in the sludge, adding a coagulant to the sludge, dewatering the sludge by filtration, and returning the effluent from elutriation to the sedimentation tank.

17. The process of treating sewage sludge including sedimentation and detention of the sludge, which comprises elutriating the sludge with an elutriating liquid obtained from the liquid sewage which is capable of appreciably diminishing the concentration of soluble biochemical decomposition products in the sludge, adding a coagulant to the sludge, and dewatering the sludge by filtration.

18. In the treatment of sewage which comprises concentrating the solids into a sludge by sedimentation, the process which comprises diminishing the concentration of decomposition products in the sludge by elutriation of said sludge, coagulating the final elutriated sludge with a ferric salt, dewatering the sludge by filtration, chlorinating the filtrate to reoxidize coagulant remaining in solution in the filtrate, and mixing the chlorinated filtrate with sewage prior to sedimentation.

19. In the treatment of sewage which comprises concentrating the solids into a sludge by sedimentation, the process which comprises diminishing the concentration of decomposition products in the sludge by elutriation of said sludge, coagulating the final elutriated sludge with a ferric salt, dewatering the sludge by filtration, chlorinating the filtrate to reoxidize coagulant remaining in solution in the filtrate and returning the chlorinated filtrate to the elutriating system for elutriating sludge therewith.

20. The process of dewatering sewage sludges which comprises diluting the sludge with an elutriating liquid and agitating the diluted mixture in the presence of air, producing a final sludge, adding a coagulant and dewatering the sludge by filtration.

21. The process of treating sewage sludges which comprises digesting a sludge, diluting the digested sludge with water to elutriate the sludge solids, agitating the so diluted sludge with air, concentrating the elutriated digested solids into a final sludge containing less decomposition products than the original digested sludge, adding a coagulant and dewatering the sludge by filtration.

22. The process of dewatering sewage sludges containing biochemical decomposition products resulting during the normal accumulation and detention of the sludge prior to dewatering, comprising mixing waste activated and non-activated sludges, elutriating the sludge mixture with a washing liquid and producing a final sludge having a lesser concentration of decomposition products than the original sludge mixture, adding a coagulant and dewatering the sludge by filtration.

23. The process of dewatering sewage sludges containing biochemical decomposition products resulting during the normal accumulation and detention of the sludge prior to dewatering, comprising elutriating a non-activated sludge with a washing liquid, and mixing the elutriated sludge with non-elutriated waste activated sludge, adding a coagulant and dewatering the sludge mixture by filtration.

24. The process of dewatering sewage sludges containing biochemical decomposition products resulting during the normal accumulation and detention of the sludge prior to dewatering, comprising treating a digested sludge with an agent which does not of itself substantially chemically lessen the useful activity of sludge coagulating agents and which appreciably diminishes the concentration of the biochemical decomposition products which chemically lessen the useful activity of sludge coagulating agents, mixing the so treated digested sludge with untreated non-digested sludge, adding a coagulant and dewatering the sludge mixture by filtration.

25. In the dewatering of sewage sludges, the process which comprises mixing digested and non-digested sludges, elutriating the mixture, adding a coagulant and dewatering the sludge by filtration.

26. In the dewatering of non-digested and digested sewage sludge mixtures the process which comprises elutriating a digested sludge and mixing the so elutriated digested sludge with an unelutriated non-digested sludge, and dewatering the sludge mixture by filtration.

27. The process of dewatering sewage sludges containing biochemical decomposition products resulting during the normal accumulation and detention of the sludge ready for dewatering, comprising mixing crude and activated sludges, diluting the sludge mixture with an elutriating liquid and agitating the mixture in the presence of air for producing a final sludge having a lesser concentration of soluble decomposition products than the initial sludge mixture, mixing a portion of the aerated and elutriated final sludge with untreated primary crude sludge, adding a coagulant to the remainder of the elutriated aerated sludge mixture, and dewatering the same by filtration.

28. In the dewatering of sewage sludge the method which comprises the preliminary washing of the sludge with a washing liquid, and dewatering the washed product by filtration whereby the sludge solids are recovered relatively dry.

29. In the dewatering of sewage sludge the method which comprises washing the sludge with a washing liquid, dosing the washed product with a coagulant, and filtering the coagulated mixture.

ALBERT L. GENTER.

Certificate of Correction

Patent No. 1,999,973. April 30, 1935.

ALBERT L. GENTER

It is hereby certified that error appears in the printed specification of the above numbered patent requiring correction as follows: Page 3, first column, line 49, for "amines" read *ammines*; page 5, first column, line 61, strike out the words "any finally settled" and insert the same before "activated" in line 62; page 10, second column, line 8, for "line" read *lime*; and lines 13 and 14, strike out the formula and insert instead $$2CaCl.OCl + NH_4HCO_3 = CaCO_3 + CaCl_2 + NH_4OCl + HOCl$$
$$NH_4OCl = NH_2Cl + H_2O;$$

and that the said Letters Patent should be read with these corrections therein that the same may conform to the record of the case in the Patent Office.

Signed and sealed this 18th day of June, A. D. 1935.

[SEAL]

LESLIE FRAZER,
*Acting Commissioner of Patents.*